(12) United States Patent
Wang

(10) Patent No.: US 6,918,269 B2
(45) Date of Patent: Jul. 19, 2005

(54) OPTICAL FIBER ALIGNING METHOD

(76) Inventor: Phillip Hua-Kuan Wang, 510 Oak Bridge Trail, Alpharetta, GA (US) 30022

( * ) Notice: Subject to any disclaimer, the term of this patent is extended or adjusted under 35 U.S.C. 154(b) by 234 days.

(21) Appl. No.: 10/045,207

(22) Filed: Oct. 22, 2001

(65) Prior Publication Data

US 2002/0162362 A1 Nov. 7, 2002

Related U.S. Application Data

(60) Provisional application No. 60/287,833, filed on May 1, 2001.

(51) Int. Cl.[7] ............................................. C03B 37/15
(52) U.S. Cl. ............................ 65/407; 65/500; 385/98
(58) Field of Search ......................... 65/406–407, 387, 65/152, 378, 485, 500–501; 385/95–99, 135–137

(56) References Cited

U.S. PATENT DOCUMENTS

| | | | | |
|---|---|---|---|---|
| 3,800,388 A | * | 4/1974 | Borner et al. ................. 29/464 |
| 4,302,267 A | * | 11/1981 | Palmer et al. ............... 156/158 |
| 4,986,843 A | * | 1/1991 | Itoh et al. ..................... 65/152 |
| 4,994,679 A | * | 2/1991 | Esser et al. ............... 250/559.3 |
| 5,668,899 A | * | 9/1997 | Jadrich ......................... 385/33 |
| 5,812,258 A | * | 9/1998 | Pierson ....................... 356/153 |
| 5,859,947 A | * | 1/1999 | Kiryuscheva et al. ....... 385/136 |
| 6,151,919 A | * | 11/2000 | Hulten et al. ................. 65/501 |
| 6,212,320 B1 | * | 4/2001 | Rickman et al. .............. 385/49 |
| 6,467,973 B2 | * | 10/2002 | Takahashi et al. ............ 385/96 |
| 6,470,120 B2 | * | 10/2002 | Green et al. .................. 385/52 |
| 6,690,864 B1 | * | 2/2004 | Dee et al. ..................... 385/52 |

* cited by examiner

Primary Examiner—Eric Hug
(74) Attorney, Agent, or Firm—AAPS Agent Al's Patent Service; Alfred H Muratori

(57) ABSTRACT

A method and device for aligning and connecting an optical fiber (or device) with another optical device, are disclosed. The method rotates the optical fiber about three axes that intersect at the end surface of the fiber core so that rotation of the fiber does not cause a translation of the end of the fiber. This allows the alignment to be done quickly and accurately. Further, by making one of the axes co-linear with the longitudinal axis of the fiber, variations or defects in the end surface (or a lens mounted thereon) can be accounted for in the alignment procedure. Once aligned the housings of the optical devices are soldered together using a hot air nozzle. The nozzle can then direct cool air toward the housings to rapidly cool the solder, or the temperature of the air can be slowly ramped down to provide for controlled cooling of the solder.

3 Claims, 3 Drawing Sheets

OPTICAL FIBER ALIGNING METHOD

This application claims benefit to provisional application No. 60/287,833 filed May 1, 2001.

FIELD OF THE INVENTION

The present invention is directed to connecting and aligning optical fibers with other optical devices to achieve maximum, optical signal transfer. In particular, the invention is directed to a method and device for automatically aligning and connecting the optical fiber.

BACKGROUND OF THE INVENTION

Fiber optic cables are being installed around the world at an ever-increasing rate. As all of these cables are of a limited length, many connectors are required, not only to increase the overall length of the cable, but also to connect the fiber optic cables to optical devices both active (amplifiers, etc.) as well as passive (filters, etc.). All fiber optic systems include these non-fiber optical devices such as couplers, isolators, wave-guides, etc, to which the optical fiber must be operationally connected. At the ends of the fiber connected to these devices there is oftentimes a lens installed to focus the optical signal for maximum transfer. With or without the lens the end of the fiber must be aligned properly with the input or output portion of the optical device, to achieve maximum signal transfer into or out of the optical fiber. After the alignment, the connection must be mechanically attached to hold the different components together.

Presently, these optical fibers (more specifically, the fiber optic cores) are aligned with the device using fixtures that are adjusted by hand, as a technician monitors a meter that measures the power of the light transferred. This method is slow and somewhat inaccurate as an incomplete attempt at all optical fiber angles relative to the device, could result in the selection of a less than optimum angle. In addition, methods used prior to the present invention do not contemplate variations in the lens or fiber optic cable termini that may be affected by the rotational angular position of the fiber as described below. After the alignment, the technician must then hand solder the components together using a soldering iron or gun to keep the connection solid. The soldering iron or gun provides a point source of heat that must be moved across the solder to allow all of the solder to flow. The several steps involved are slow and meticulous, therefore there exists a need for an automatic and efficient method and device for aligning and connecting the optical fibers on a mass production scale.

SUMMARY OF THE INVENTION

By fully automating the alignment and connecting of fiber optic connections, the present invention provides an efficient method of mass producing optical systems with minimal optical signal power loss at the optical fiber connections. The preferred method of the present invention includes holding the optical device (that the fiber is to be connected to) stationary, while moving the fiber in three dimensions to locate the optimal alignment. It should be understood, however, that the fiber may alternatively be held stationary, while the optical device is moved. It should also be understood that the devices and methods of the present invention can be used to align and connect two sub-components to one another. An optical test signal is sent through either the fiber or the device, with the other being connected to a sensor capable of providing an electrical signal indicative of the received test signal strength. In this manner, the alignment between the device and the fiber can be adjusted in a complete hemispherical sweep of all three dimensions. During the sweep, the measured values of the signal strength are stored. Once the sweep is completed, the greatest test signal strength is identified, and the alignment can be returned to the stored alignment of the greatest signal strength.

An important aspect of the present invention is the location of the rotational axis that the moved fiber or device are rotated about in each of the three dimensions. It has been found that when these three axes intersect at the end of the fiber, the alignment can be conducted quickly and accurately without the need for simultaneously moving the device to which the fiber is to be connected. Additionally, one of the three axis of rotation is maintained coextensive with the longitudinal axis of the fiber. This allows for rotating the terminating surface of the fiber to adjust for variations in that surface, or for variations on any lens mounted thereon. The device of the present invention includes means to move the fiber to the correct distance from the optical device during the alignment procedure, so that the connection can be made once the alignment procedure is over.

Once the alignment has been completed, the various components of the connection must be strongly bonded to each other to maintain that alignment. To achieve a connecting method that is fast, reliable and accurate, the present invention uses heated air (or other gas) that is directed toward pre-attached solder strips on the connector housing. The connector may include any number of internal passive or active optical components, and includes an outer metallic tube for housing these components and attaching the connector to the optical fibers. The optical fibers are terminated in a pigtail assembly that also includes an outer metallic tube for directing the ends of the optical fibers, (and for manipulation during alignment). The amount the pigtail assemblies are inserted into the connector, as well as the exact angle between the pigtail assembly and the connector must be maintained during and after the alignment procedure, to maximize signal transfer. While the preferred alignment method is automatic as described herein, the connecting method of the present invention can be used with manual alignment methods as well. The two ends of the connector are provided with the pre-attached strips of solder extending beyond the opening into which the pigtail assemblies are inserted. These strips overlap the pigtail assembly's outer tube once the pigtail assembly is inserted into the end of the connector. While these components are held in their aligned position, two hot air nozzles are moved towards the connector. The hot air nozzles are each in the shape of a half-cylinder, such that the connector is substantially surrounded by the hot air nozzles. Hot air is then fed to the hot air nozzles. A plurality of openings in the internal portion of the nozzles directs the hot air towards the solder, causing it to flow onto the overlapped portion of the pigtail assembly. Once the solder has flowed, the hot air flow is stopped, and the nozzles are removed. The solder than cools, leaving a strongly bonded connector and pigtail assembly. Should a faster cooling rate be desired, cooling air can be supplied to the nozzles. If a slower cooling rate is required, then the temperature of the air supplied can be slowly ramped down. An important advantage of the connecting method of the present invention is the ability to uniformly heat the solder, as opposed to soldering methods having point sources of heat. The uniform heating allows all of the solder to reach the proper temperature simultaneously, thereby avoiding overheating and the damage that may cause. It should be understood that other connecting methods or devices may be used with the alignment method of the present invention, the connecting method and device shown here being the preferred embodiments.

DETAILED DESCRIPTION OF THE PREFERRED EMBODIMENT

The present invention may be understood more readily by reference to the following detailed description of preferred embodiments of the invention and the figures.

Figure 1:
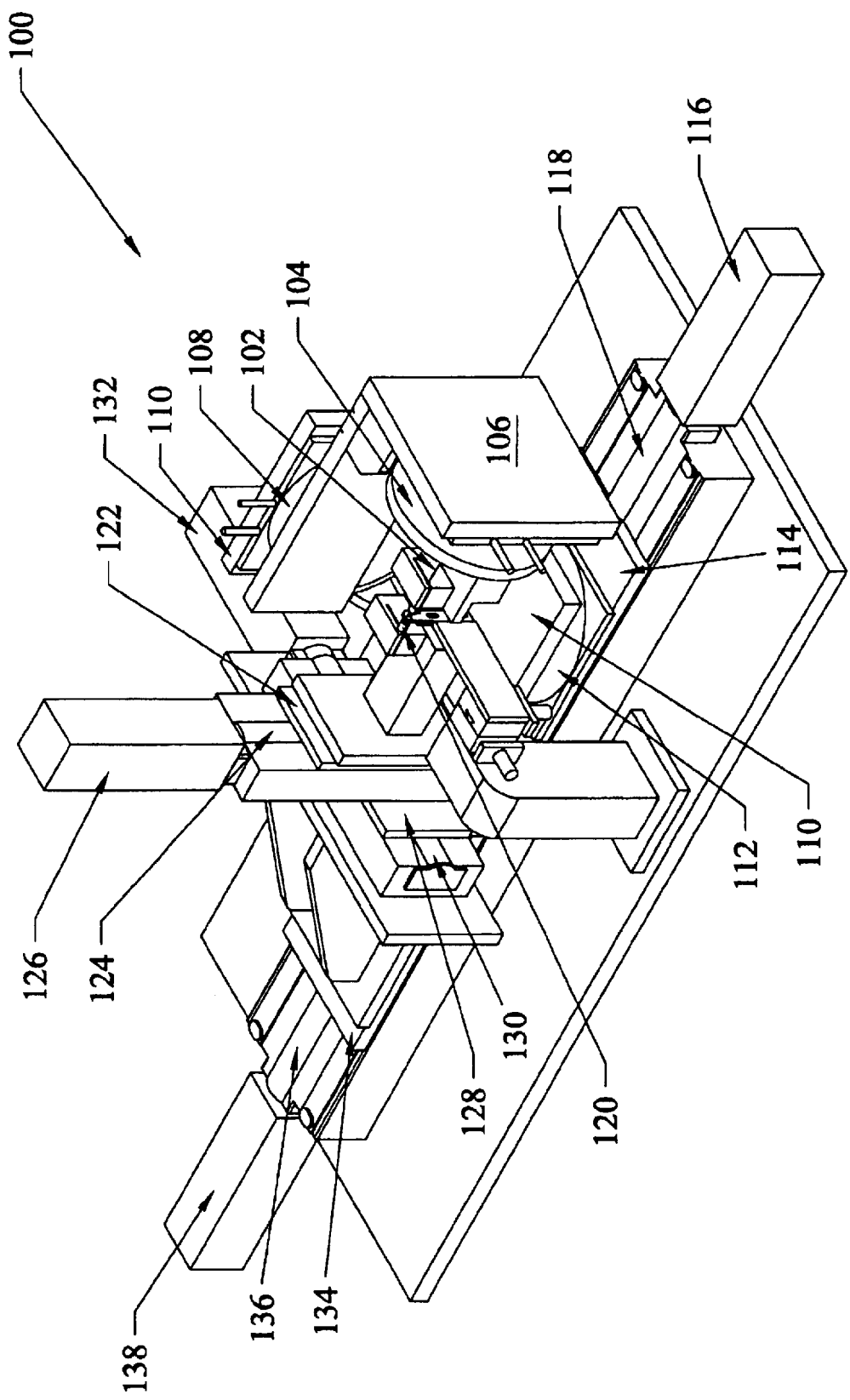
FIG. 1 is an isometric view of an optical fiber alignment device according to the present invention.

In FIG. 1, the fiber optical cable alignment device 100 of the present invention is illustrated. The fiber optic cable 102 is supported on a first turntable 104. Turntable 104 rotates the cable 102 about its longitudinal axis and is mounted on a first L-shaped bracket 106. The L-shaped bracket 106 is in-turn mounted on a second turntable 108. Turntable 108 rotates the cable 102 (as well as bracket 106 and turntable 104) about a horizontal axis that is orthogonal to the longitudinal axis of the cable 102. Turntable 108 is mounted on a second L-shaped bracket 110 that is in-turn mounted on a third turntable 112. Turntable 112 is mounted on a platform 114, that moves the cable 102 (and the supporting hardware) towards and away from the coupler 120 (or other optical device as discussed in the summary) via a worm gear 118 and a drive motor 116. As described above, the turntables 104, 108 and 112 adjust the angle between the cable and the coupler for maximum signal transfer. This is done by providing a light source (not shown) to send an optical signal into the coupler 120 or cable 102 and a sensor (not shown) for measuring the signal transferred to the other of the cable 102 or coupler 120. While the alignment may be done manually, it is preferred that the sensor provides a feedback signal to a computer, and the computer would adjust the turntables for maximum signal transfer.

The cable alignment device 100 also includes positioning means for the coupler 120. The coupler 120 is mounted on a first platform 122 that is moved vertically via a worm gear 124 and a drive motor 126. This assembly is in-turn mounted on a second platform 128 that is moved laterally by another worm gear 130 and a drive motor 132. Again this assembly is mounted on a third platform 134 that is moved (along with the first and second platforms and the coupler 120) longitudinally by a third worm gear 136 and drive motor 138. The above-described positioning means for the coupler 120, allows for aligning the coupler 120 independently of the fiber optic cable 102. A bracket 140 provides a reference location and additional support for the coupler, once it is in position for alignment with the fiber optic cable 102.

Figure 2:
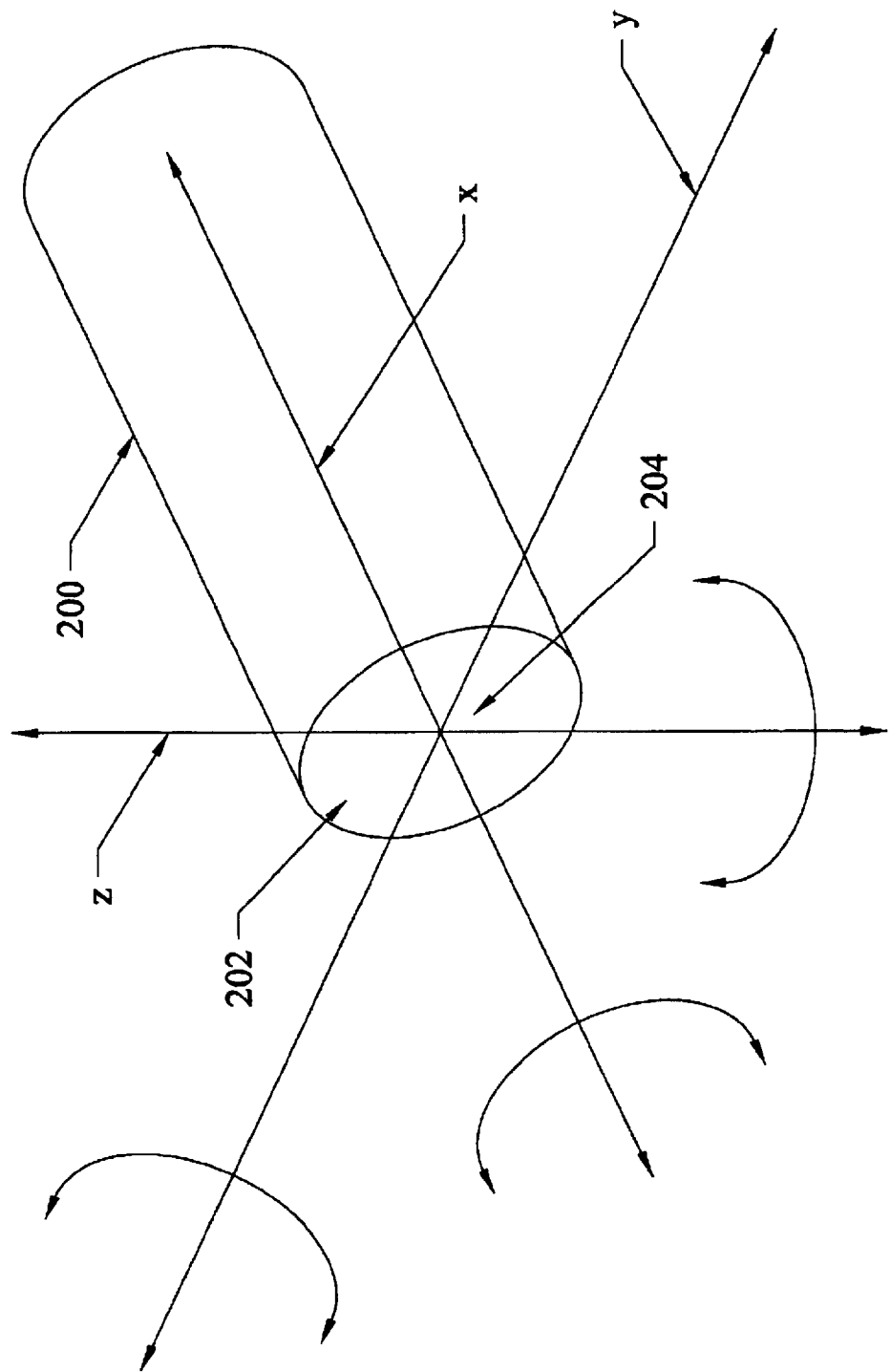
FIG. 2 is an enlargement of the end of the optical fiber showing the intersection of the three axes of rotation of the alignment method of the present invention.

While FIG. 1 illustrates one type of device for performing the alignment method of the present invention, the principal feature of the present invention is the position of the rotational axes used in the alignment procedure. FIG. 2 shows the relative positions between these axes and the end of the fiber optic core 200 (the portion of the cable 102 that actually carries the optical signal). The end surface 202 of the fiber optic core 200 may include a lens (not shown) to focus the light of the optic signal. The x axis is shown as co-linear with the longitudinal axis of the fiber optic core 200. This is an important feature of the present invention as rotation about the x axis allows for variations or defects in the lens or end surface 202. As the core 200 is rotated about the x axis, more or less light from the optical signal is transferred to the optical device 120, due to the variations or defects in the lens or end surface 202 of the core 200. The vertical axis of rotation is indicated as z, and the transverse horizontal axis is indicated as y. The three axes intersect at a point 204 that lies in the center of the end surface 202 of the core 200. This arrangement allows adjustment of any of the three angles of rotation without causing a translation of the end surface 202 of the fiber optic core 200. Thus the speed of changing these angles is increased and the alignment procedure can be done much more quickly than by conventional alignment methods.

Figure 3:
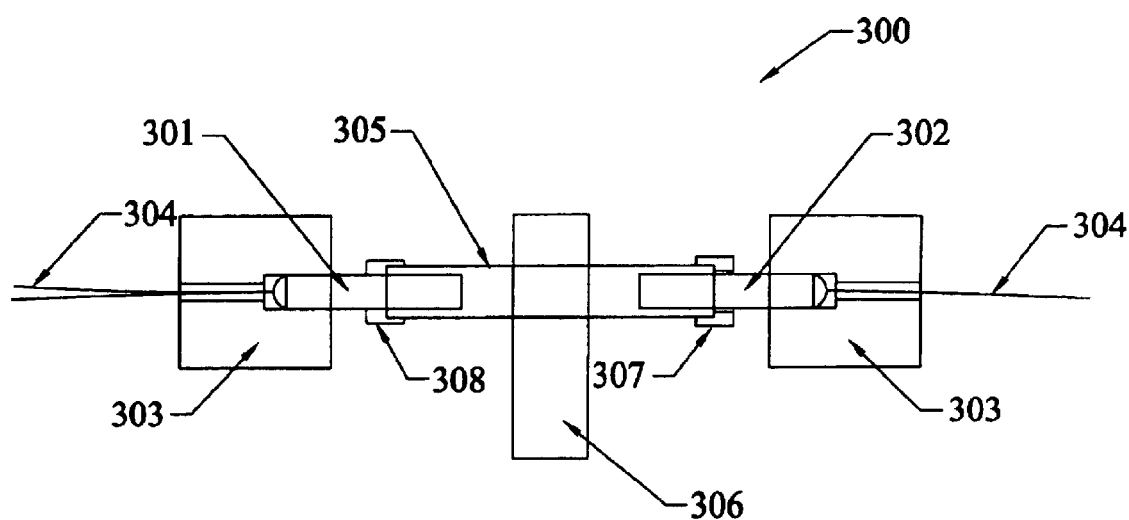
FIG. 3 shows a side cross section of a fiber optic connector with pre-attached solder strips and two fiber optic pigtail assemblies.

FIG. 3 shows a side view of a connector assembly 300 mounted in either an automatic or manual fiber optic aligning device. The connector includes an outer metallic tube 305 that is held in place by a clamp 306 or other portion of the alignment mechanism. The optical fibers 304 are shown terminating in pigtail assemblies 301 and 302, that also include outer metallic tubes. The pigtail assemblies 301 and 302 are also held in position by a clamp 303 or other portion of the alignment mechanism. A strip of solder 307 and 308 is provided about both ends of the outer tube of the connector 305. Strip 307 is shown as not having been heated. Once the alignment procedure has resulted in a minimum insertion loss, hot air is supplied to the solder as described below, until the solder flows and contacts both the connector and the pigtail assembly (as shown by solder strip 308).

Figure 4:
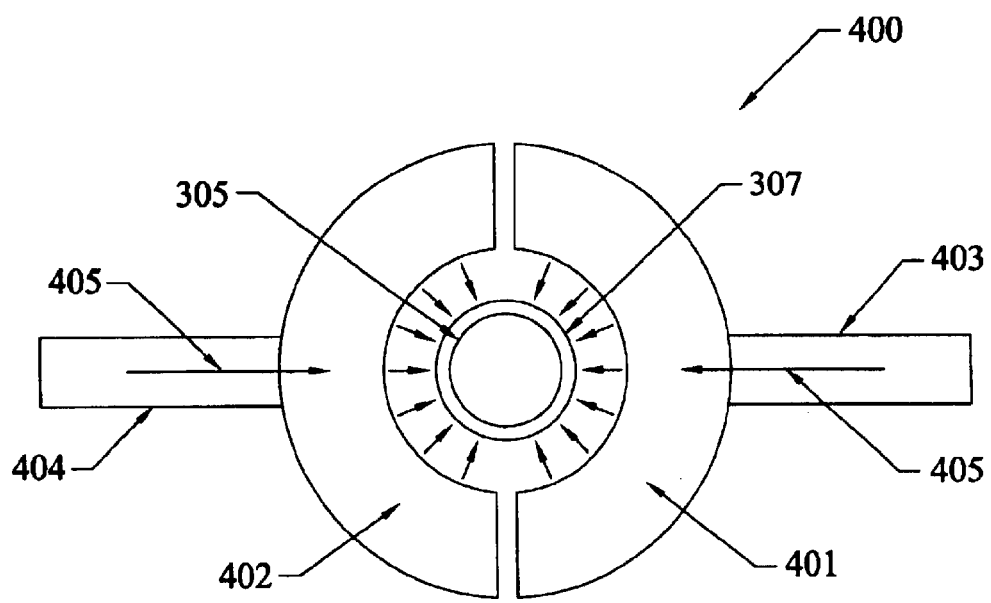
FIG. 4 shows a cross sectional end view of the connector, solder and a fiber optic pigtail assembly, with the hot air nozzles of the present invention positioned thereabout.

Turning to FIG. 4, the connector tube 305 and the solder 307 are shown in cross section. As can be seen, the solder extends completely around the connector 305. Hot air nozzles 401 and 402 are shown surrounding the connector and the solder. These nozzles are in the shape of half cylinders and include a plurality of internal openings to direct hot air 405 from the supply tubes 403 and 404 toward the solder as shown by the arrows. The hot air nozzles can be moved to this position after the alignment procedure is completed, or prior to the alignment procedure. It should also be noted that the nozzles 401 and 402 can be supplied in pairs such that one pair surrounds one end of connector tube 305 and the second pair surrounds the other end of the tube 305. This configuration may be required depending on the physical shape of the alignment equipment. In a further embodiment, the nozzles 401 and 402 may be replaced by a single cylinder nozzle having an open end. Once the alignment procedure is completed, the pigtail assembly and connector tube would be inserted into the open end of the cylinder. After soldering, the connected components are removed from the cylinder.

One possible alignment and connecting procedure is as follows:

1) position the hot air nozzles around the alignment path (the area the connector and pigtail assemblies will occupy).
2) Start aligning the components in the middle of the hot air nozzle loop (center of the circular area formed by the nozzles)
3) When a minimum insertion point is found by the aligning algorithm, turn on the hot air supply to the nozzles. The temperature of the air is determined by the solder's melting point.

4) Continuing to search and maintain the point of minimum insertion loss, until the solder flows and just before shutting off the hot air supply.

The solder components are then allowed to cool naturally or at a controlled rate. As previously described, to control the cooling rate, warm air can be supplied to the nozzles, with the temperature being slowly lowered to ambient, at a predetermined ramp rate.

What is claimed is:

1. A method of aligning an optical fiber with an optical device, the fiber having a longitudinal axis and an end surface proximate to the device, said method comprising the step of rotating the optical fiber about a first axis, a second axis and a third axis, said third axis, said second axis and said first axis intersecting at the center of said end surface.

2. The method of claim 1, wherein said first axis is co-linear with the longitudinal axis of said optical fiber.

3. A method of aligning an optical fiber with an optical device, the fiber having an end surface proximate to the device, said method comprising the steps of a) rotating the optical fiber about a first axis;

b) rotating the optical fiber about a second axis; and c) rotating the optical fiber about a third axis; wherein said first axis, said second axis and said third axis intersect at the center of said end surface.

* * * * *